UNITED STATES PATENT OFFICE.

JUSTIN H. HAYNES AND WILBER D. ENGLE, OF DENVER, COLORADO, ASSIGNORS TO THE DOLORES REFINING COMPANY, OF DENVER, COLORADO.

PROCESS OF TREATING ORES.

No. 808,839.        Specification of Letters Patent.        Patented Jan. 2, 1906.

Application filed March 20, 1905. Serial No. 251,000.

*To all whom it may concern:*

Be it known that we, JUSTIN H. HAYNES and WILBER D. ENGLE, citizens of the United States, residing in the city and county of Denver and State of Colorado, have invented a certain new and useful Process of Treating Ores; and we do declare the following to be a full, clear, and exact description of the invention, such as will enable others skilled in the art to which it appertains to make and use the same.

Our invention relates to a process for treating ore containing uranium or vanadium, or both of these metals.

In carrying out our process the ore is first suitably crushed, preferably so that it will pass through a twelve-mesh screen or finer, and is then boiled with a solution of alkaline carbonate, preferably sodium carbonate or potassium carbonate, until the uranium and vanadium or either contained in the ore is brought into solution. The strength of the sodium-carbonate solution and the length of time necessary to boil is determined by the uranium and vanadium in the ore and will probably vary with every district. We would state, however, that one hundred pounds of sodium carbonate for one ton of ore for every per cent. of uranium and vanadium or either will give good results. So far as the time during which the boiling treatment should be continued we may state that ordinarily this step of the process should be continued about one hour. It must be understood, however, that the proportion of the sodium carbonate or other alkaline carbonate employed to a ton of ore may be varied, and we therefore do not intend to limit ourselves to any exact proportions. Neither do we wish it understood that we are limited as to any exact time or period for boiling the ore. After the uranium and vanadium or either is dissolved the clear solution is then separated and the uranium precipitated by the addition of sodium hydroxid as sodium uranate. This precipitate is then separated, and the solution then contains all of the vanadium. From this solution, either with or without neutralization, the vanadium is precipitated as calcium vanadate by the addition of water-slaked lime. The usual method for the treatment of this ore has been to roast the ore with dry salt. This converts the vanadium into sodium vanadate, soluble in water, and the uranium, into sodium uranate, insoluble in water. The mass is then treated with water until all of the vanadium is dissolved. The residue is treated with sulfuric acid, which brings normally all the other metals into solution, including uranium. From this the uranium is separated by the addition of various chemical reagents, making a very complex and expensive process.

Our invention consists in the treating of the ore either with or without a preliminary roasting with a solution of alkaline carbonate, preferably sodium carbonate, at any temperature that is deemed advisable. This treatment brings the uranium into solution in the form of a double carbonate of sodium and uranium of the formula

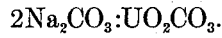

$$2Na_2CO_3 \cdot UO_2CO_3.$$

The vanadium is brought into solution, preferably, of the formula $Na_2V_2O_7$. All the other elements present in the ore are undissolved and are consequently left in the residue or tailings. This method in some cases works better by giving the ore a preliminary roasting. It may also be said that the temperature at which the ore is to be treated varies somewhat with the district from which the ore comes.

Having thus described our invention, what we claim is—

1. The herein-described process of treating ores containing uranium, consisting in boiling the crushed ore with a solution of alkaline carbonate until the uranium contained in the ore is brought into solution.

2. The herein-described process of separating uranium and vanadium from ore, consisting in first crushing the ore to be treated; second, boiling the ore with a solution of alkaline carbonate until the metal to be extracted is placed in solution; third, drawing off the solution containing the dissolved metals; and finally precipitating the said metals, the uranium being precipitated by the addition of sodium hydroxid as sodium uranate, while the vanadium is precipitated as calcium vanadate by the addition of water-slaked lime.

In testimony whereof we affix our signatures in presence of two witnesses.

JUSTIN H. HAYNES.
                WILBER D. ENGLE.

Witnesses:
   A. J. O'BRIEN,
   DENA NELSON.